June 18, 1940.  J. S. REID  2,204,622

METHOD OF MANUFACTURING WINDLACE CORD

Filed March 27, 1936

INVENTOR.
James S. Reid
BY
ATTORNEY.

Patented June 18, 1940

2,204,622

UNITED STATES PATENT OFFICE 2,204,622

METHOD OF MANUFACTURING WINDLACE CORD

James S. Reid, Cleveland, Ohio, assignor to Rubatex Products, Inc., New York, N. Y., a corporation of Delaware Application March 27, 1936, Serial No. 71,239

3 Claims. (Cl. 18—59)

This invention relates to novel methods for manufacturing windlace cord and more particularly relates to the manufacture of windlace by an extrusion process.

The object of this invention is to provide novel methods for manufacturing windlace cord with extruded gas expanded rubber segments. In a co-pending application, Serial No. 45,050, filed October 15, 1935, and assigned to the same company as is the present invention, a continuous process for manufacturing windlacing utilizing the enclosing fabric as a mold is disclosed. This invention, however, contemplates the manufacture of windlacing wherein triangular segments of cellular rubber are used to build up the circular core. Individual molds for the segments are employed.

In order to more clearly illustrate the present invention, reference is made to the drawing, in which.

The composition of the rubber core may consist of the following ingredients compounded in the indicated proportions by weight.

|  | Pounds | Ounces |
|---|---|---|
| Smoked rubber sheets | 50 | 0 |
| Zinc oxide | 3 | 7 |
| Whiting | 15 | 0 |
| Light calcined magnesia | 8 | 0 |
| Sulphur | 1 | 0 |
| Carbon black | 1 | 0 |
| Paraffin wax | 1 | 8 |
| Agerite powder |  | 10 |
| Heliozone |  | 4 |
| Diphenylguanidine |  | 5 |
| Captax |  | 1¾ |

Reasonable changes in these proportions, or in the specified components are entirely feasible. The ingredients are individually mixed on the mill in a manner well known in the art of rubber compounding. The individual sheets of rubber are masticated or softened into a single soft mass by masticating rollers which are heated to a temperature of 150° F. The rubber dough or mix is prepared in the manner described in the United States Patent No. 1,905,269, dated April 25, 1933, to Denton and in United States application Serial No. 717,550, filed March 27, 1934, assigned to the same company as is the present invention.

Figure 1:
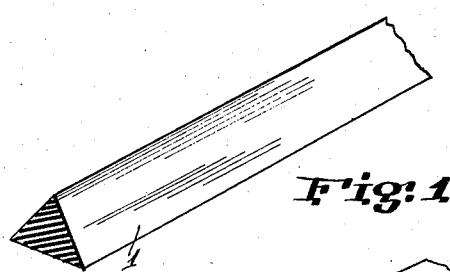
Figure 1 is a partial perspective view of a triangular extruded rubber core element.

The dough is formed into strings 1 having a triangular cross-section as shown in Figure 1. The most practical method for producing continuous lengths of string 1 of the rubber dough is to extrude it by means well-known in the mechanical arts.

Figure 2:
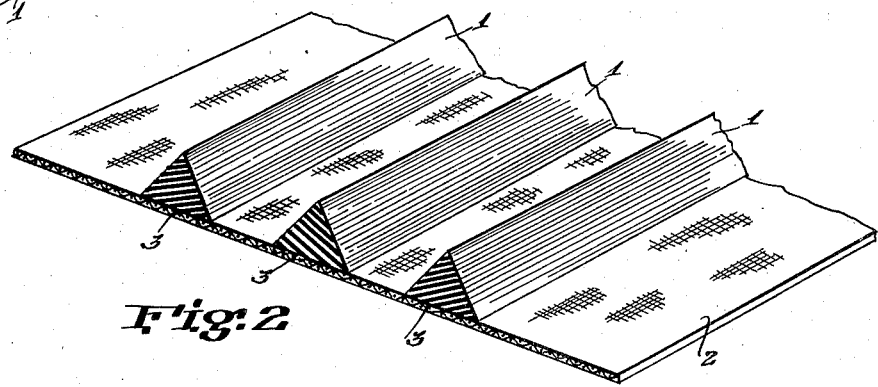
Figures 2 and 3 illustrate successive stages in the novel windlace manufacturing process according to the present invention.

Figure 2 is a perspective illustration of the next stage in the manufacturing process. The windlace cloth strip 2 is coated on the inside surface with liquid latex or is otherwise "frictioned" in any suitable manner known to the art. Three triangular strips 1 of rubber dough are then positioned upon the central portion of the latexed side of cloth strip 2 as illustrated in Figure 2. The bottoms 3 of the triangular strips 1 are accordingly cemented to the frictioned surface of cloth strip 2. The distance between the strips 1 is predetermined to form a smooth circular core for the completed windlacing as will be understood from the following.

The cloth 2 with the attached rubber strips 1 is placed within an autoclave. Suitable triangular metal containers are superimposed upon the strips 1 to allow for the proper partial expansion during the gassing stage. Inert gas, preferably nitrogen, is admitted to the autoclave at a pressure of the order of 200 atmospheres after the air therein has been extracted to a vacuum of about five inches of mercury.

While the gas is being forced into the rubber, steam at a few pounds pressure is admitted to the steam chest of the autoclave. The rubber, while exposed to the gas at the high pressure, is in a soft plastic state, and therefore readily adsorbs the gas. The steam at the few pounds pressure produces a temperature at which partial vulcanization proceeds to a substantially uniform degree throughout the body of the rubber strings. This partial vulcanization functions to harden the rubber sufficiently so that it retains the gas forced into it.

The autoclave is now permitted to cool off under atmospheric conditions and cold water subsequently is forced through the steam jacket until a temperature of 60°–70° F. is reached. This permits the rubber, in a semi-cured state, to set.

Figure 3:
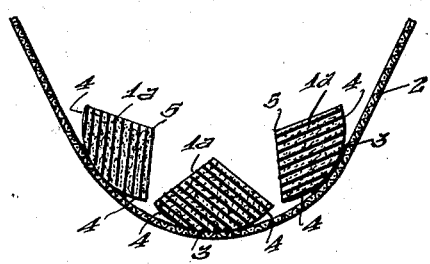

Excess gas in the autoclave is now removed. The rubber strings, being partially cured, will hold the gas in its individual cells under pressure. The strings 1 when removed from the autoclave will expand to a larger size, as shown in the sectional illustration, Figure 3, of the expanded rubber strings 1a, due to the reduction of the surrounding gas pressure.

The outer edges 4 of the bottom surfaces of expanded strips 1a will, during the expansion stage, be offset or otherwise freed from the cloth strip 2. The central section 3 of the bottom surface of strip 1a will be cemented to the cloth 2. The apex angles 5 of strips 1a are designed to be 120° so that they may mesh to form a completely circular (360°) core 6.

The partially cured rubber 1a is then subjected to the final curing stage in a manner described in the Denton patent and in the application referred to hereinabove. Necessary molding forms are provided to maintain the proper final size and shape of the triangular segments comprising the windlacing of the present invention.

It will now be evident that the completed structure comprising the three core sections 1a attached to the cloth strip 2 may be used as a windlace cord or weather-stripping.

Figure 4:
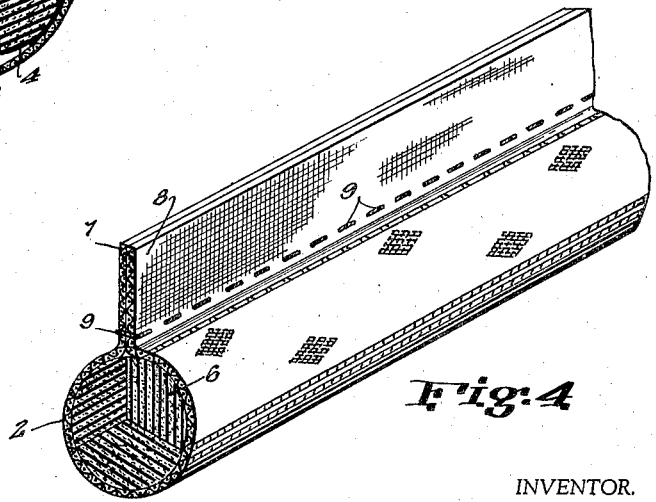
Figure 4 is a partial perspective view of the completed windlace cord.

Figure 4 is a perspective illustration of the assembled windlace cord. The ends 7 and 8 of the cloth strip 2 are pinched together, preferably by stitching 9 so that the central core 6 will be contained as a circular core. The three segments 1a mesh to form a completed circle. It is not necessary to stitch the ends 7 and 8 of the windlacing. These ends may be suitably fastened in position by tacking them to the door opening or other frame to be weatherstripped, the windlace cord being accordingly maintained in its proper shape.

Although this invention has been illustrated in conjunction with the manufacture of windlace cord, it will be evident to those skilled in the art that other related articles, such as weatherstripping in general, rubber rope and gaskets may be produced in a similar manner and I do not intend to be limited except as set forth in the following claims.

I claim:

1. The method of manufacturing expanded rubber articles which comprises applying a plurality of strips of rubber composition of triangular cross-section to a layer of fabric spaced apart by a predetermined distance, the apex angle of the plurality of triangular strips totaling 360°; impregnating the rubber strips with an inert gas at a relatively high pressure applied externally of the rubber composition; finally expanding the rubber strips so that they become offset from the fabric and so that their apex angles total 360 degrees, jointly wrapping the fabric to form said strips into a cylindrical core; and engaging the outer edges of the fabric to enclose the circular rubber core.

2. The method of manufacturing fabric covered closed cell gas expanded rubber which comprises securely applying to a layer of fabric a plurality of strips of rubber spaced apart by a predetermined distance; impregnating the rubber strips with an inert gas; expanding the gas impregnated rubber strips so that said strips are offset on each side from the fabric layer; and wrapping the fabric layer around the offset rubber strips to form a fabric covered closed cell gas expanded rubber.

3. The method of manufacturing fabric covered closed cell gas expanded rubber which comprises securely applying to a layer of fabric a plurality of strips of rubber spaced apart by a predetermined distance; impregnating the rubber strips with an inert gas; partially vulcanizing said gas impregnated rubber strips; expanding the gas impregnated rubber strips so that said strips are offset on each side from the fabric layer and so that the sum of the apex angles of the strips equals 360 degrees; and wrapping the fabric layer around the gas expanded offset rubber strips to form a fabric covered closed cell gas-expanded rubber.

JAMES S. REID.